United States Patent [19]

Singh et al.

[11] 3,831,990

[45] Aug. 27, 1974

[54] BUMPER GUARD AND SIDEWALL PROTECTOR

[76] Inventors: Bhupindar Singh, Northridge; Donald A. Swauger, Chatsworth, both of Calif.

[22] Filed: July 26, 1973

[21] Appl. No.: 382,905

[52] U.S. Cl. .......................... 293/1, 293/71, 52/716
[51] Int. Cl. ............................................. B60r 19/00
[58] Field of Search ................. 293/1, 62, 70, 71 R; 52/716, 717, 718; 267/140, 141, 139

[56] References Cited
UNITED STATES PATENTS

| | | | |
|---|---|---|---|
| 2,986,419 | 5/1961 | Barenyi | 293/71 R X |
| 3,110,066 | 11/1963 | Ward et al. | 52/716 X |
| 3,572,798 | 3/1971 | Kunevicius | 293/1 |
| 3,687,502 | 8/1972 | Loew | 293/1 |
| 3,715,138 | 2/1973 | Finkle | 293/1 |

*Primary Examiner*—M. Henson Wood, Jr.
*Assistant Examiner*—John J. Love

[57] ABSTRACT

A unitary homogenious structure of resilient material on the order of rubber, neoprene and the like in the form of an impact absorbing bead on an integral mounting base in which a pair of adhesive bearing crescent-like skirts extend symmetrically rearwardly from the bead at hinge-like segmental portions and tend to have internal stresses when pressed into adherance with any surface on a vehicle body to cling thereto for securing such bead in a foremost impact receiving position therefrom.

5 Claims, 15 Drawing Figures

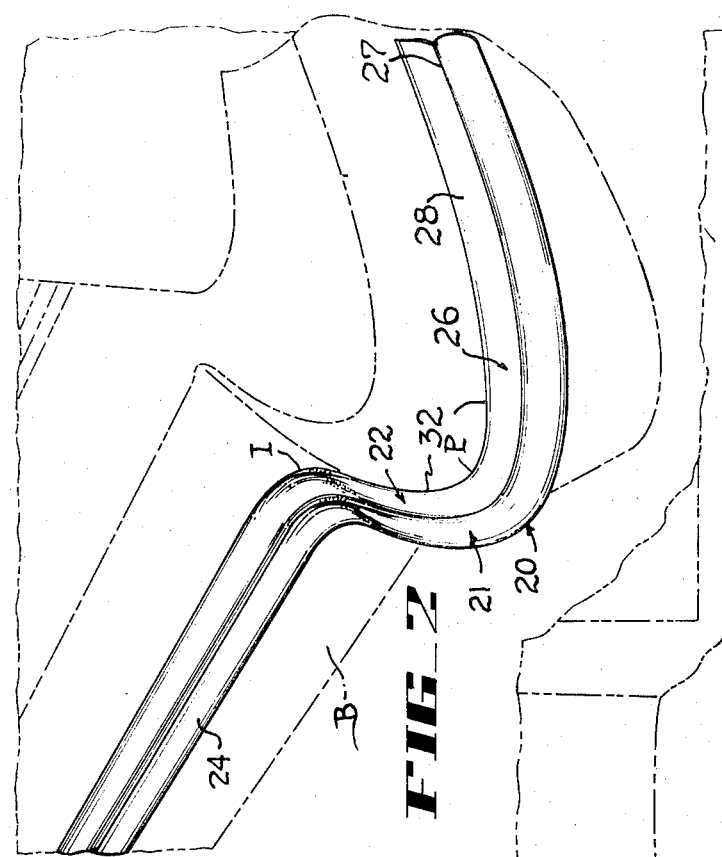
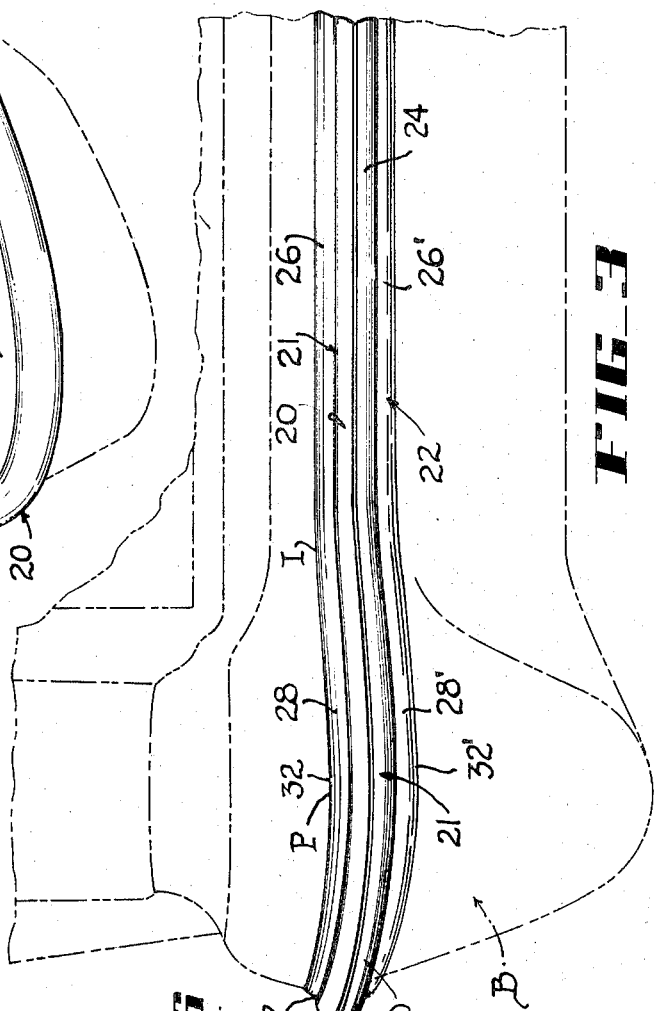
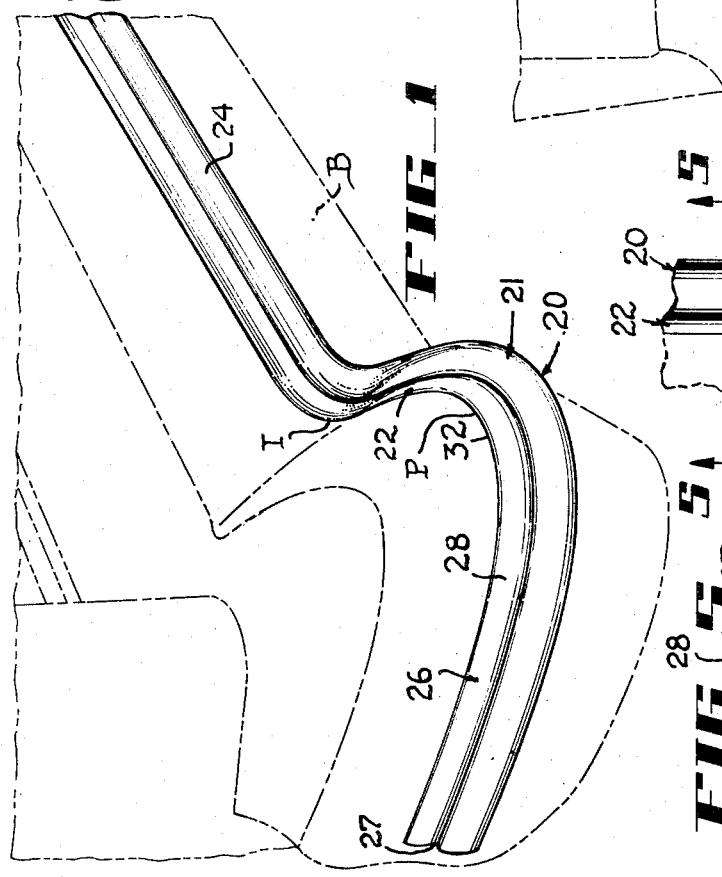
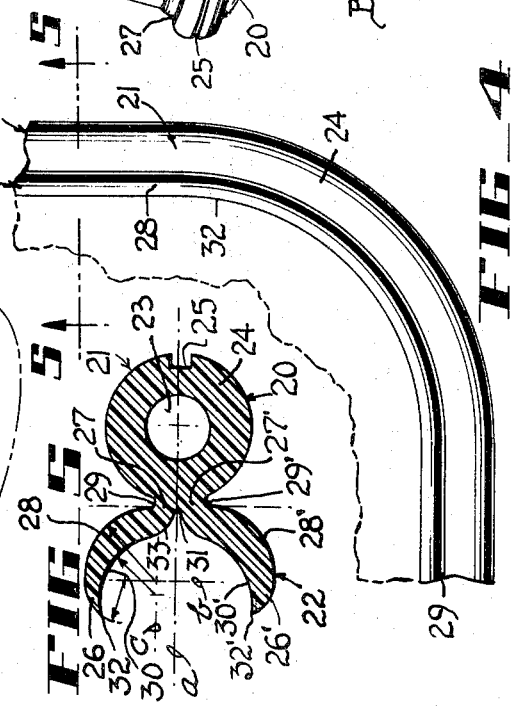

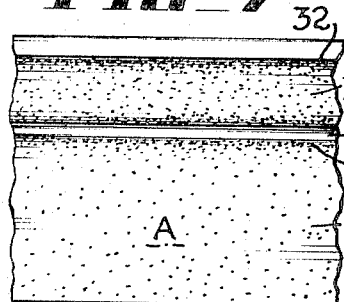
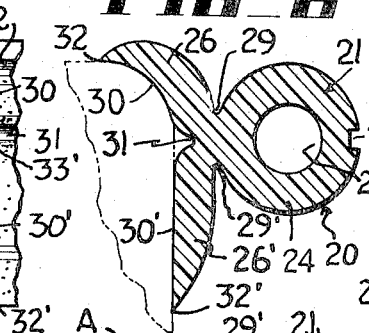
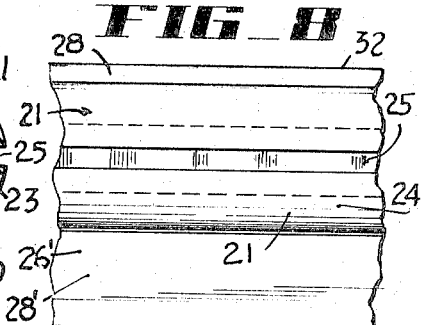
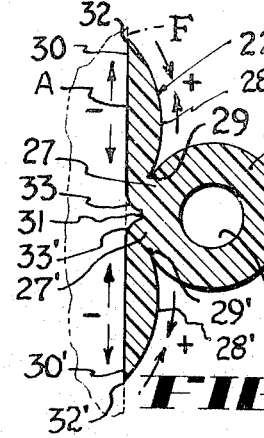
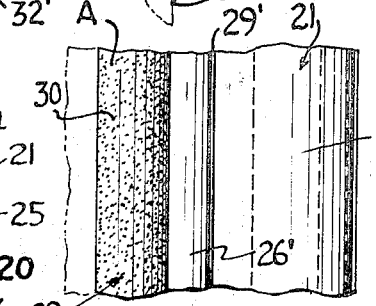
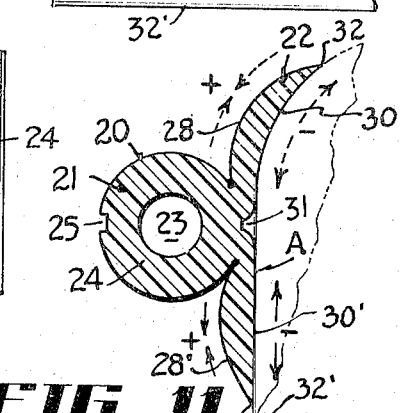
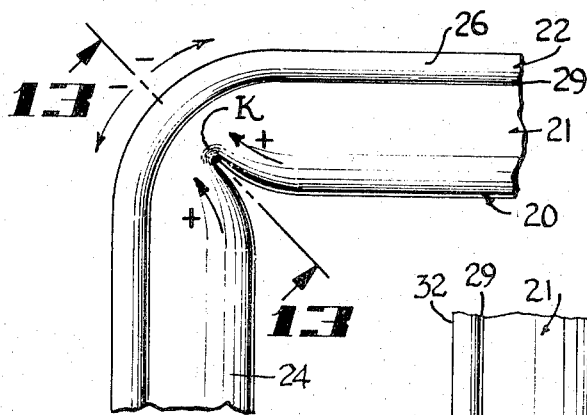
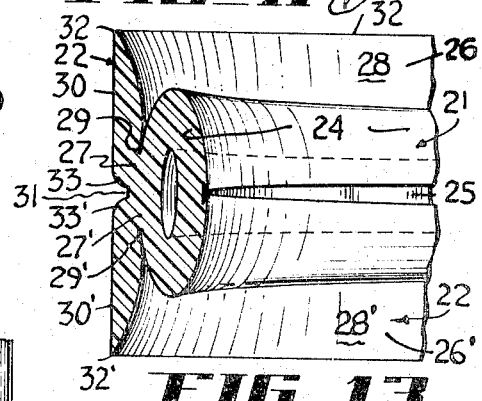
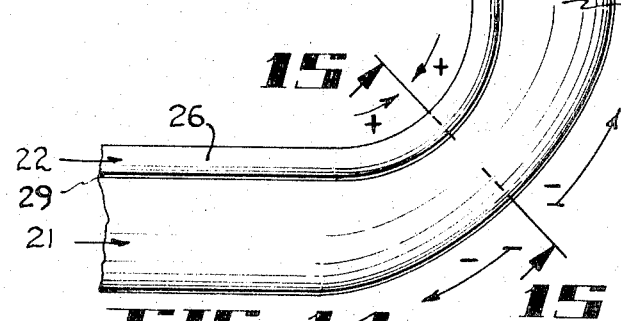
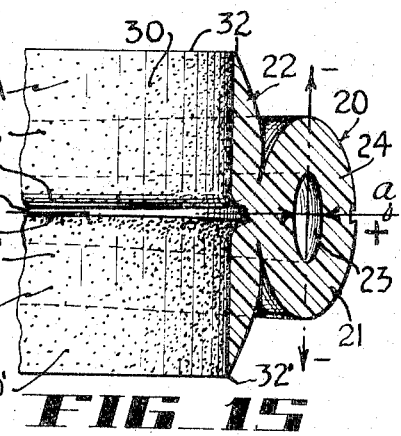

3,831,990

BUMPER GUARD AND SIDEWALL PROTECTOR

BACKGROUND

This invention relates to bumper-side wall protectors for vehicles and more particularly to a unitary structure of elastic material adapted to conform to various surface contours for securing thereto.

The art is repleat with various types and kinds of moldings adapted to be applied to the side walls, doors and other exterior surfaces of vehicle bodies for the purpose of protecting such surfaces from becoming knicked, dented or otherwise defaced when struck by an object.

Heretofore, the front and rear bumpers of vehicles were of sturdy construction and mainly for purpose of withstanding physical impact. More recently the bumpers of vehicles have become decorative and contoured variously to present more esthetic conformity with the body design of the vehicle. Such decorative bumpers are chrome plated and usually include monolythic wrap-around ends for protecting the fenders as well as the front grill and/or the back tail-light panels and trunk of vehicle bodies. Due to such various configurations being stamped into bumper structures, the material from which they are made have to be of lighter gauge. In most cases these bumpers are easily dented, bent and misshapened upon very light impact. As a result, it has become an expensive proposition to correct even the slightest damage to such bumpers. In most cases due to the specially designed contours and configurations, it is more economical to replace a damaged bumper than to have it hammered out and/or straightened. This is so because heat is usually required and the chrome plating so disfigured that the entire bumper has to be replated after being corrected.

The present invention contemplates the provision of an aplique type bumper and/or side wall protector so constructed as to conform to the facial or surface contours and configurations of various vehicle body designs and to provide a projection for absorbing any initial thrust applied such surfaces by an object striking the same or struck thereby.

STATEMENT OF THE INVENTION

The present invention has its embodiment in a bumper-side wall protector made up from a homogeneous mass of elastic material on the order of rubber and preferably of neoprene. It is an object of this invention to so mold and/or extrude such material into an object engaging bead-like projection formed integrally with a mounting base adapted to conform to various shapes and contours on the surface of the side walls or bumpers of vehicles.

In connection with the foregoing object, it is an object to provide an impact receiving projection adapted to absorb the initial thrust of impact for cushioning the ultimate result thereof and for protecting the surface upon which it is mounted from excessive damage and/or deformity.

It is another object of this invention to form an integral mounting base on such impact absorbing projection by the provision of wing-like flanges each having a resiliency such as to conform to the contour of a surface to which it is to be attached. In this connection, it is an object to provide a pair of such flanges tangent to one side of the impact absorbing bead by the formation of hinge-like connection therewith whereby such flanges freely yield to compression toward alignment of the flanges into tangent relation with such bead.

These and other objects and advantages of the present invention will become apparent in the following description and claims along with the disclosures in the accompanying two sheets of drawing in which:

FIG. 1 is a fragmentary perspective view of the left rear bumper of a vehicle having the bumper-side wall protector of the present invention applied thereto;

FIG. 2 is a fragmentary perspective view of the right rear bumper of a vehicle having the bumper-side wall protector of the present invention applied thereto;

FIG. 3 is a substantially straight-on elevational view of FIG. 1;

FIG. 4 is a fragmentary plane view of wide-radius corner of a vehicle bumper having the bumper-side wall protector of the present invention applied thereto;

FIG. 5 is a cross-section through the bumper-side wall protector alone, taken substantially along line 5—5 in FIG. 4 and unapplied to a vehicle;

FIG. 6 is a section similar to that of FIG. 5 applied to a flat surface and over a short-radius upper curved surface;

FIG. 7 is an elevational view of a fragmentary length of the bumper-side wall protector alone as seen from the lefthand side of FIG. 6;

FIG. 8 is an elevational view of a fragmentary length of the bumper-side wall protector alone as seen from the righthand side of FIG. 6;

FIG. 9 is a bottom plan view of a fragmentary length of the bumper-side wall protector as seen from below in FIG. 6;

FIG. 10 is a section similar to that of FIG. 5 showing the bumper-side wall protector applied to a flat vertical surface;

FIG. 11 is a view similar to that of FIG. 5 showing the bumper-side wall protector applied to a flat vertical surface with a gradually curved upper surface;

FIG. 12 is a fragmentary plan view of the bumper-side wall protector applied to an inside curved surface of short radius;

FIG. 13 is a section through FIG. 12 taken substantially along line 13—13 therein;

FIG. 14 is a fragmentary plan view of the bumper-side wall protector applied to an outside curved surface of short radius; and FIG. 15 is a section through FIG. 14 taken substantially along line 15—15 therein.

GENERAL DESCRIPTION

The bumper and/or side wall protector embodying the present invention generally designated 20 includes an impact absorbing bead 21 formed integrally with a mounting base 22 which is in tangent relation with the bead 21. The mounting base 22 is provided with a suitable adhesive A or dual sided strip thereof as is well known on the market for securing the bead to the surface of an automobile body, its side wall or bumper as the case may be in a conventional manner.

DETAILED DESCRIPTION OF THE INVENTION

In accordance with the present invention, the impact absorbing bead 21 and the mounting base thereof are integrally formed as a unitary structure of a common resilient material such as rubber and the like. This unitary structure of a bumper and/or side wall protector 20 may be either molded or extruded from such resilient material. For purposes of the present invention, the material preferably is the synthetic variety known as neoprene because of its toughness, resistance to air, sunlight and the deteriorating effects of smog and/or ozone.

In the course of developing the bumper protector 20 toward the embodiment of the present invention, the formation of the mounting base 22 contigious to the bead 21 required certain critical aspects. The formation of the mounting base is critical to the end that it must afford universal adaptation thereof to various contours, conditions and surface configurations presented on the many designs and makes of automotive vehicles.

Referring to FIG. 5 showing a cross section through the bumper protector 20 it will be noted that the bead 21 and mounting base 22 are formed as a unitary monolithic entity. The impact absorbing bead 21 is preferably hollow centered as at 23 and formed as a relatively thick cylindrical body 24 lengthwise (as shown in other views of the drawing).

For purposes of illustration and orientation the area of the periphery of the bead 21 exposed foremost and most vulnerable to contact upon impact with an outside object, is shown to have a shallow channel shaped groove 25 formed lengthwise the bead 21. The mounting base 22 is formed integrally with the bead diametrically opposite its formost grooved periphery.

In accordance with the present invention, the mounting base 22 comprises a pair of wing-like skirts 26 and 26' formed on opposite sides of an imaginary line struck diametrically on a fore to aft axis $a$ across the member 20 from its foremost to its rearmost peripheral area. These wing-like skirts 26 and 26' are preferably symmetrically arranged and identically configurated. Therefore like reference numerals are applied to each and distinguished from each other by prime exponents.

These wing-like skirts 26 and 26' are of slightly lesser thickness than the wall of the cylindrical body 24 and are connected to the bead 21 at a narrow segmental portion 27–27' at the periphery of the bead. The portions 27–27' are equidistant from and on opposite sides of the aforesaid diametric fore to aft axis $a$ of the bead formation. The outer ends of these segmental portions 27–27' merge with the outer-formost surfaces 28–28' of the winglike skirts 26–26' by narrow coved recesses 29–29', respectively. The inner or back surfaces 30 and 30' of the wing-like skirts are separated from each other at the diametric axis $a$ by a distinct flat surfaced nitch 31. The surface of the nitch 31 is disposed in a plane radially rearward from the bead 21 substantially tangent to the point of mergance of the outer surfaces 28–28' of the skirts 26–26' with the coved recesses 29 and 29', respectively. The narrowed segmental portions 27 and 27' of the resilient material thus formed provide hinge connections between the skirts 26–26' and the bead 21 for reasons later to be made apparent.

Referring again to FIG. 5 it will be noted that each of the wing-like skirts 26–26', except for the hinge connections 27–27', are crescent shaped and terminate at their outer extremities in a feather edge 32–32'. In other words, the outer surfaces 28–28' are struck on a radius spaced as at $b$ inwardly from the coved recess 29–29' and offset from the diametric axis $a$ in the plane C thereof parallel to the latter. The inner surface 30–30' is struck from a center on plane $c$, in offset relation inwardly of the plane $b$ and on a radius of lesser dimension than the radius of the outer surfaces 28–28'. The arc of the inner surface 30–30' terminates at the feather edge 32–32' whereas the arc of the outer surface 28–28' tapers down to the feather edge 32–32' on a reduced radius having its center on the plane $b$ and offset outwardly from the axis $a$ and plane $c$. At the juncture of the inner surfaces 30–30' with the hinge connections 27–27' the inner surface merges with an inversed curve 33 terminating at the outer limit of the flat surfaced nitch 31 and on a radius substantially the distance of the offset relation of the plane $c$ from the axis $a$.

The foregoing configuration of each of the wing-like skirts 26–26' and their hinge connections to the bead 21 at the segmental portions 27–27' is of utmost importance to the present invention. It is important because it facilitates the compound results of compression of these crescent shaped skirts along one edge while compensating for extension, i.e., stretching of the latter along an opposite edge to conform to the contour or shape of a bumper or other surface to which the bead 21 is to be applied. The advantages of this configuration of the crescent shaped skirts 26–26' will be appreciated from an examination of a few possible conditions illustrated in the drawings and now to be explained.

FIGS. 1, 2 and 3 illustrate one form of bumper B upon which the protector 20 of the present invention is applied. In these views the skirting 26–26' forming the base 22 are shown to have their back faces 30–30' conforming to the contour and shape of the bumper B. It should here be noted that the inner back faces 30–30' and skirting 26–26' are adapted to set flush with the surface of the bumper around a parabolic outside curve P as well as an abrupt inside curve I merging therewith.

FIGS. 6, 10 and 11 illustrate various surface conditions to which the base 22 of the protector 20 may be applied. These views are cross sections comparable to that of FIG. 5 in which the wing-like skirts 26–26' are shown in their normal condition of repose due to the resilient characteristics of the material in which the bumper protector 20 is constructed. By comparison between the normal condition of repose as in FIG. 5 with the application thereof to a flat surface F as in FIG. 10 the advantages of the resilient character of the material and the critical nature of its form is demonstrated.

In this connection it will be noted that the crescent shape of the wing-like skirts 26–26' when pressed firmly toward and secured to a flat surface F causes internal stresses to occur within the resilient material as follows:

1. At the hinge connections 27–27', the coved recesses 29–29' close up due to positive compression of the material; and
2. at the inverse curve 33–33', a negative pressure or expansion, i.e. stretching of the material occurs opening up the flat surfaced nitch 31.
3. Along the inner surface or back wall 30–30' of each wing-like skirt 26–26', a negative pressure or stretching of the material takes place; whereas
4. along the outer surface 28–28', the material is compressed by a positive pressure therein.

These positive and negative pressures within the material tending to return the wing-like skirts 26–26' toward their normal condition of repose aids and assists the adhesive coating or strip on the back faces 30–30' in securing the skirts to the flat surface F. Even the feather edges 32–32' of the skirts 26–26' being stretched as in FIG. 10 tending to return toward normal condition assur against the skirts peeling off of the surface F to which they adhere.

The same conditions exist in an installation such as is illustrated in FIGS. 6 and 11. In FIG. 6, the upper skirt 26 is substantially in normal repose while the lower skirt 26' is stressed as explained above in connection with FIG. 10. In FIG. 11 the same conditions occur except that the upper skirt 26 is only slightly stressed as explained, between normal repose, FIG. 5 and extreme conditions, FIG. 10.

FIGS. 12 and 13 illustrate a condition which occurs when the bumper protector 20 of the present invention is applied to a tight inside curved surface. In such an installation the bead 21 itself is subjected to internal stresses, pressures and distortion. See for example the kink K on the angle — line 13—13 bisecting the arc of an inside curved surface. This kink K as illustrated in section in FIG. 13 results in a partial collapse of the normal cylindrical form of the bead 21 into along oval shape in a crosswise direction. This creates a positive pressure or compression within the front areas marked with a +sign (FIG. 12) on the periphery of the bead 21 between both right angled portions of the latter which are in normal condition of repose. The pressure within the bead 21 is inwardly toward the curved surface whereas the stresses in the wing-like skirts 26-26' has an expanding effect thereon as per arrows.

FIGS. 14 and 15 show a condition opposite to that of FIGS. 12 and 13. In FIGS. 14 and 15 the bumper protector 20 is applied to a tight outside curved surface struck on a radius substantially the same as that shown in FIGS. 12 and 13. Here, again it will be noted that the bead 21 itself is subjected to internal stresses. The bead 21 is compressed together along the diametric axis $a$ and is stretched in a direction transversely of axis $a$ along a radial line (15—15) bisecting the angle between the straight portions (FIG. 14). At the skirting zone the material thereof is compressed as per the arrows. The reaction of the stresses and compression within the material of the bead 21 as well as the mounting base 22 tends to cause the bumper protector to hug the curved surface of FIG. 14.

As in all of such installations the bumper protector 20 should be mounted on the most forwardly or outwardly extended projection on the vehicle regardless of contour or configuration of the surface. The bumper protector bead 21 and mounting base 22 thereof configurated and constituted as above described provides a unitary structure 20 which by its own resiliency lends itself to installation on surfaces such as the side wall of a vehicle and/or various contours of bumper designs. The bead 21 of the bumper protector when disposed beyond the surface of a vehicle body or bumper will abosorb the first thrust of impact with an object. This will not only alert the driver of the vehicle to such occurance but will also afford a cushioning effect to minimize or reduce the damage from the full force of impact. The resiliency and unitary construction of the material from which the bead and mounting base is made further affords a distribution of the thrust over a lineal area to protect the surface upon which it is mounted from any deep cuts or defacing scratches.

Having thus described the bumper and/or side wall protector in specific detail it will be appreciated by those skilled in the art that the same may be susceptible to modifications, alterations and/or variations without departing from the spirit or scope of the invention therein as set forth in the appended claims.

What we claim as new and desire to protect by Letters Patent is:

1. In a bumper guard and side wall protector provided with an adhesive coated back surface for securing the same to parts of a vehicle body, a unitary structure of resilient material comprising in combination:
   1. an impact absorbing bead having a fore edge adapted to receive impact from an outside source;
   2. a mounting base formed integrally of and with said bead on the after side thereof;
   3. said base including a pair of wing-like skirts united with the side of said bead at segmental portions thereof on either side of the fore to aft axis of said bead to provide hinge-like connections between the latter and said skirts;
   4. each of said skirts, at repose, having a crescentlike configuration termination in a feather edge and providing an adhesive coated concaved back surface and adapted to yield to internal stresses in conforming to the contour and configuration of a surface to which said mounting base is applied.

2. The structure in accordance with claim 1 in which the material is neoprene.

3. The bumper guard and side wall protector in accordance with claim 1 in which each of said wing-like skirts of crescent-like configuration has an arcuate outer surface extending from said feathered edge to a coved recess formed at the point of mergence of the outer extremity of said segmental hinge-like connection with said bead for yielding to forward pressure against said skirts by a surface to which said mounting base is applied.

4. The bumper guard and side wall protector in accordance with that of claim 3 in which each of said wing-like skirts of crescent-like configuration has:
   1. an outer arcuate surface struck on a radius from a point spaced inwardly from the after end of said bead on a plane offset from the fore to aft axis of the latter substantially the same as the offset relation of said coved recesses on the outer extremities of said segmental hinge portions; and
   2. an inner concaved adhesive receiving surface struck on a radius from a point on the same plane of offset as and of lesser dimension than that of said outer arcuate surface and extending from said terminal feather edge to a point of mergence with an inversed curve struck on a radius substantially the thickness of said skirt from a point congruent to the point of mergence of said outer arcuate surface with said coved recess.

5. The bumper guard and side wall protector in accordance with that of claim 4 in which the concaved inner surface of each of said wing-like skirts merges with an inverse curve terminating at a flat surfaced nitch transverse to the fore to aft axis of said bead periphery which is substantially aligned with the point of mergence of said outer arcuate surface with said coved recesses.

* * * * *